(12) United States Patent
Choi et al.

(10) Patent No.: US 9,298,040 B2
(45) Date of Patent: Mar. 29, 2016

(54) LIQUID CRYSTAL DISPLAY DEVICE WITH WIDE-VIEWING ANGLE

(71) Applicant: LG DISPLAY CO., LTD., Seoul (KR)

(72) Inventors: Sang-Woong Choi, Yangsan-si (KR);
Jeong-Hoon Ko, Ulsan (KR);
Hyoun-Sung Son, Chilgok-gun (KR);
Eun-Jung Kim, Gumi-si (KR);
Dong-Ha Yoo, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 90 days.

(21) Appl. No.: 14/144,142

(22) Filed: Dec. 30, 2013

(65) Prior Publication Data

US 2014/0192297 A1      Jul. 10, 2014

(30) Foreign Application Priority Data

Jan. 4, 2013   (KR) .......................... 10-2013-0001310

(51) Int. Cl.
*G02F 1/1335*    (2006.01)
*G02F 1/13363*   (2006.01)
*G02F 1/1343*    (2006.01)

(52) U.S. Cl.
CPC ...... *G02F 1/13363* (2013.01); *G02F 1/133634* (2013.01); *G02F 1/134363* (2013.01); *G02F 2001/133638* (2013.01); *G02F 2413/02* (2013.01); *G02F 2413/06* (2013.01)

(58) Field of Classification Search
CPC .......... G02F 1/133528; G02F 1/13363; G02F 1/133634; G02F 2202/40; G02B 5/3033; G02B 5/3016; G02B 5/3083

USPC ...................................................... 349/96, 117
See application file for complete search history.

(56) References Cited

U.S. PATENT DOCUMENTS

| 6,356,325 | B1 | 3/2002 | Shimoshikiryo | |
| 2005/0213012 | A1* | 9/2005 | Yano et al. | 349/141 |
| 2006/0172128 | A1* | 8/2006 | Shinohara | 428/212 |
| 2008/0198305 | A1* | 8/2008 | Kye et al. | 349/96 |
| 2009/0153783 | A1* | 6/2009 | Umemoto | 349/96 |
| 2009/0316093 | A1* | 12/2009 | Sekime | 349/117 |

FOREIGN PATENT DOCUMENTS

| CN | 1673831 A | 9/2005 | |
| CN | 101609223 A | 12/2009 | |
| CN | 101688995 A | 3/2010 | |
| TW | I388431 B | 3/2013 | |
| WO | WO 2009/072815 A2 * | 6/2009 | ............ G02F 1/1335 |
| WO | WO 2009/072815 A2 | 6/2009 | |

* cited by examiner

*Primary Examiner* — Mike Qi
(74) *Attorney, Agent, or Firm* — Birch, Stewart, Kolasch & Birch, LLP (57) ABSTRACT

An LCD device includes a liquid crystal panel; a first polarizer attached to a first surface of the liquid crystal panel and including a first polarizing film, first and second optical compensation films disposed on one surface of the first polarizing film, and a phase retardation film, a protective film and a functional film disposed on another surface of the first polarizing film; and a second polarizer attached to a second surface of the liquid crystal panel and including a second polarizing film, an inner protective film disposed on one surface of the second polarizing film, and an outer protective film disposed on another surface of the second polarizing film, wherein the first polarizing film is disposed between the phase retardation film and the liquid crystal panel, and the phase retardation film has a retardation value of $\lambda/4$.

10 Claims, 5 Drawing Sheets

FIG. 1

Related Art

FIG. 2

Related Art

FIG. 3

Related Art

LIQUID CRYSTAL DISPLAY DEVICE WITH WIDE-VIEWING ANGLE

The present application claims the priority benefit of Korean Patent Application No. 10-2013-0001310 filed in the Republic of Korea on Jan. 4, 2013, which is hereby incorporated by reference in their entirety.

BACKGROUND

1. Field of the Disclosure

The present disclosure relates to a liquid crystal display device, and more particularly, to a liquid crystal display device with wide-viewing angles.

2. Discussion of the Related Art

With rapid development of information technologies, various types of display devices for displaying images have been required. Recently, flat panel display (FPD) devices such as liquid crystal display (LCD) devices, plasma display panel (PDP) devices and organic electroluminescent display (OLED) devices have been widely used.

Among the various types of FPD devices, liquid crystal display (LCD) devices have been widely used as monitors for notebook computers and desktop computers because of their excellent contrast ratio, low power consumption and superiority in displaying moving images.

Generally, an LCD device includes two substrates and liquid crystal material therebetween. The two substrates include respective electrodes and are disposed such that the electrodes face each other. When voltages are applied to the electrodes, an electric field is induced between the electrodes, and liquid crystal molecules are arranged by the electric field. The arrangement of the liquid crystal molecules varies depending on the electric field, and transmittance of light passing through the liquid crystal layer is controlled. Images can be displayed by controlling the light transmittance of the liquid crystal material.

Since an LCD device including thin film transistors as a switching element, referred to as an active matrix LCD (AM-LCD) device, has excellent characteristics of high resolution and displaying moving images, the AM-LCD device has been widely used.

The AM-LCD device includes an array substrate, a color filter substrate and a liquid crystal layer interposed therebetween. The array substrate may include a pixel electrode and thin film transistor, and the color filter substrate may include a color filter layer and a common electrode. The AM-LCD device is driven by an electric field between the pixel electrode and the common electrode to have excellent properties of transmittance and aperture ratio. However, since the AM-LCD device uses a vertical electric field that is perpendicular to the substrates, the AM-LCD device has poor viewing angles.

An in-plane switching (IPS) mode LCD device having a wide viewing angle property has been suggested and developed to resolve the above-mentioned limitations Hereinafter, an IPS mode LCD according to the related art will be described with reference to accompanying drawings.

Figure 1:
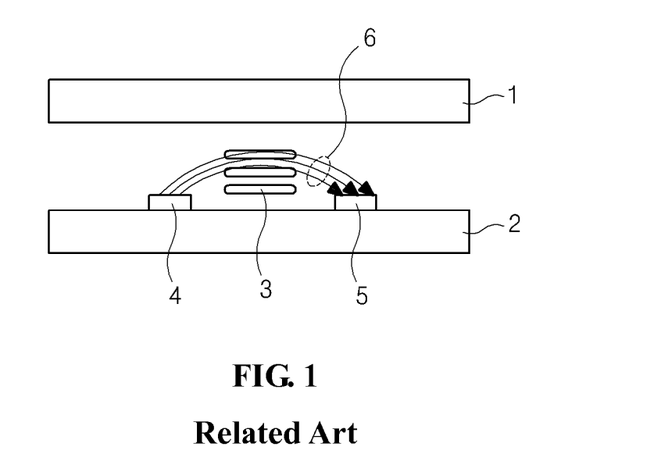
FIG. 1 is a cross-sectional view of schematically illustrating an IPS mode LCD device according to the related art.

FIG. 1 is a cross-sectional view of schematically illustrating an IPS mode LCD device according to the related art.

In FIG. 1, an upper substrate 1 and a lower substrate 2 are spaced apart from each other, and a liquid crystal layer including liquid crystal molecules 3 is disposed between the substrates 1 and 2. A pixel electrode 4 and a common electrode 5 for driving the liquid crystal molecules 3 are formed on the lower substrate 2. When voltages are applied to the pixel electrode 4 and the common electrode 5, a horizontal electric field 6 parallel to the substrates 1 and 2 is generated between the pixel electrode 4 and the common electrode 5. The liquid crystal molecules 3 are moved and differently arranged by the horizontal electric field 6. The substrates 1 and 2 and the liquid crystal layer constitute a liquid crystal panel.

Upper and lower polarizers (not shown) are attached to upper and lower substrates 1 and 2 of the liquid crystal panel, respectively, and transmission axes of the upper and lower polarizers are perpendicular to each other. The liquid crystal molecules 3 change polarization state of light passing trough the lower polarizer according to their arrangement, and the light having the changed polarization state is selectively transmitted by the upper polarizer, thereby displaying an image.

In the IPS mode LCD device, the liquid crystal molecules are arranged according to the horizontal electric field, and thus viewing angles of the device are widened.

Moreover, the IPS mode LCD device has an advantage of low image distortion when it is used for a touch screen perceived by touch, and the IPS mode LCD device has been widely used for portable devices such as smart phones or tablet personal computers.

However, in the IPS mode LCD device according to the related art, there is no optical problem when it is seen at its front, and there is light leakage to cause an increase in black level of brightness and a decrease in contrast ratio when it is seen at its sides.

Accordingly, to compensate the optical properties at side viewing angles, one or more optical compensation films have been suggested and adopted between the polarizers and the liquid crystal panel.

Meanwhile, the potable devices are frequently used outside as well as inside. When a portable device is used outside, glaringness occurs due to sunlight reflected at its surface, and visibility is lowered. Therefore, a poly ethylene terephthalate (PET) layer may be formed on the upper polarizer over the liquid crystal panel to prevent the glaringness.

Figure 2:
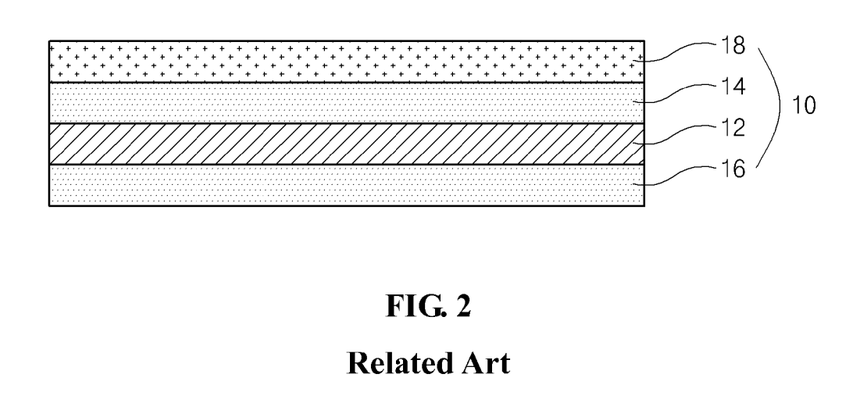
FIG. 2 is a view of schematically illustrating a polarizer according to the related art.

FIG. 2 is a view of schematically illustrating a polarizer according to the related art and corresponds to an upper polarizer.

In FIG. 2, the related art polarizer includes a polarizing film 12, first and second protective films 14 and 16, and a PET layer 18.

The polarizing film 12 is formed by stretching poly-vinyl alcohol (PVA), and n absorption axis of the polarizing film 12 is formed along a stretching direction. Light vibrating in a direction parallel to the absorption axis is absorbed by the polarizing film 12, and light vibrating in a direction perpendicular to the absorption axis is selectively transmitted by the polarizing film 12.

Poly-vinyl alcohol used for the polarizing film 12 has strong hydrophile property and weak moisture resistance. Thus, bonds between polymers in the polarizing film 12 are weakened by moisture, and the polarizing film 12 shrinks in the stretching direction. To prevent the shrinkage of the polarizing film 12, protective materials, which have low dimension changes by moisture, are attached to both sides of the polarizing film 12 and used for the first and second protective films 14 and 16, thereby restraining the shrinkage of the polarizing film 12.

The PET layer 18 is formed on the first protective film 14. The PET layer 18 prevents glaringness to improve visibility. In addition, the PET layer 18 increases surface hardness.

By the way, the PET layer 18 has phase retardation, and linearly-polarized light passing through the polarizing film 12 of the polarizer 10 is changed into elliptically-polarized light while passing through the PET layer 18.

In the meantime, sunglasses are used outside to prevent glaringness due to sunshine and to block UV rays. Polarized sunglasses are preferred because of vivid views and fine UV-blocking. However, when the portable device is viewed through the polarized sunglasses, color differences are caused according to viewing angles.

This will be explained with reference to FIG. 3.

Figure 3:
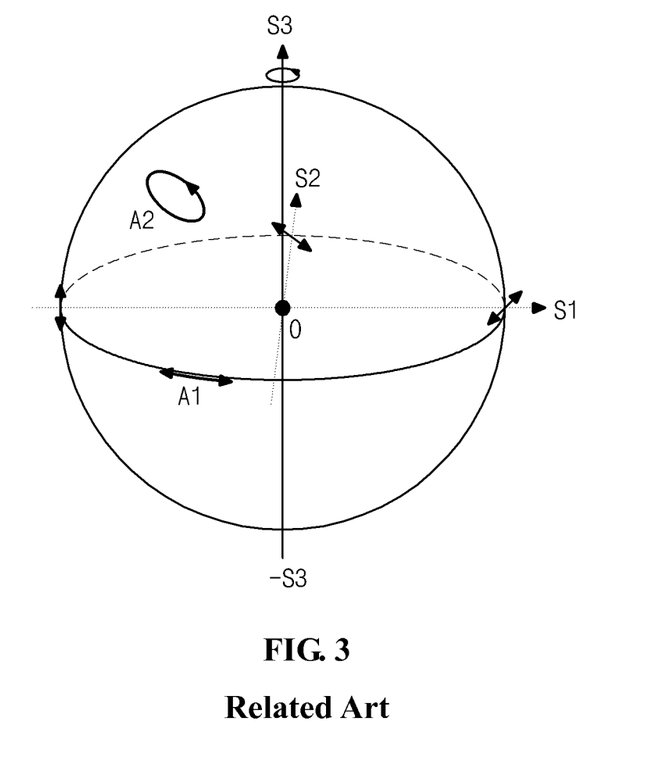
FIG. 3 is a view of illustrating Poincare sphere showing polarization state of light passing through the polarizer of FIG. 2 and an absorption axis of polarized sunglasses.

FIG. 3 is a view of illustrating Poincare sphere showing polarization state of light passing through the polarizer of FIG. 2 and an absorption axis of polarized sunglasses.

In FIG. 3, the absorption axis A1 of the polarized sunglasses is disposed on the equator of Poincare sphere corresponding to linearly-polarized light, and the polarization state of light passing through the PET layer of the polarizer of FIG. 2 is disposed on the upper hemisphere of Poincare sphere corresponding to left-handed elliptically-polarized light.

Accordingly, when the LCD device including the polarizer of FIG. 2 is viewed through the polarized sunglasses, since the polarization state A2 of light passing through the polarizer of FIG. 2 does not coincide with the absorption axis A1 of the polarized sunglasses, degrees of polarization vary according to viewing angles, and the color differences are caused.

To solve the problem, additional films may be necessary. Particularly, an optical compensation film may be added to the polarizer to compensate the optical properties at side viewing angles. However, in this case, a thickness of the polarizer is increased by about 300 micrometers to about 400 micrometers.

SUMMARY OF THE INVENTION

Accordingly, the present invention is directed to a liquid crystal display device with wide-viewing angles, which substantially obviates one or more of the problems due to limitations and disadvantages of the related art.

An object of the present disclosure is to provide a liquid crystal display device with wide-viewing angles that includes a relatively thin polarizer.

Another object of the present disclosure is to provide a liquid crystal display device with wide-viewing angles that does not have the limited viewing angles due to polarized sunglasses and displays high quality images.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a liquid crystal display device includes a liquid crystal panel; a first polarizer attached to a first surface of the liquid crystal panel and including a first polarizing film, first and second optical compensation films, a phase retardation film, a protective film, and a functional film, wherein the first and second optical compensation films are disposed on one surface of the first polarizing film, and the phase retardation film, the protective film and the functional film are disposed on another surface of the first polarizing film; and a second polarizer attached to a second surface of the liquid crystal panel and including a second polarizing film, an inner protective film, and an outer protective film, wherein the inner protective film is disposed on one surface of the second polarizing film, and the outer protective film is disposed on another surface of the second polarizing film, wherein the first polarizing film is disposed between the phase retardation film and the liquid crystal panel, and the phase retardation film has a retardation value of λ/4.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

Figure 4:
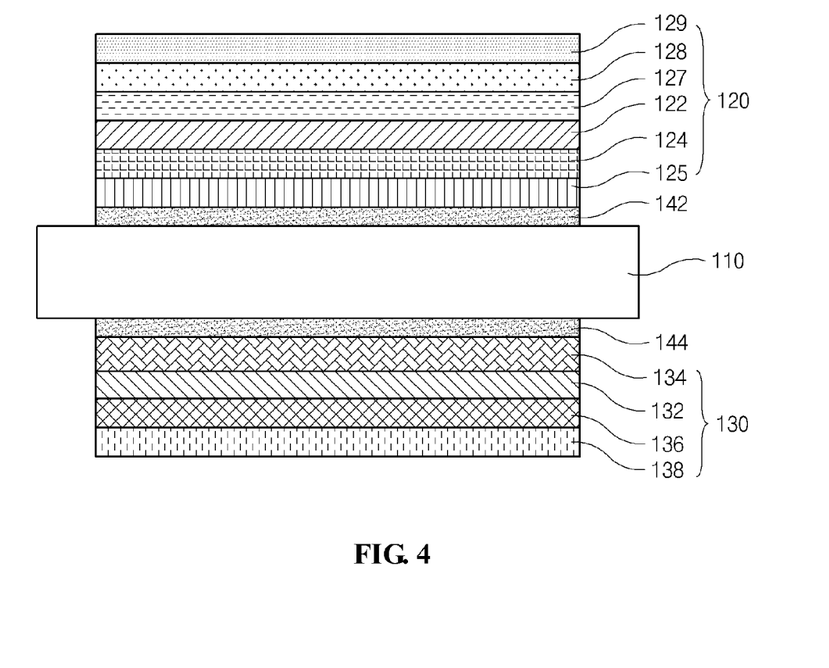
FIG. 4 is a cross-sectional view of schematically illustrating a liquid crystal display (LCD) device with wide-viewing angles according to an exemplary embodiment of the present invention.

FIG. 4 is a cross-sectional view of schematically illustrating a liquid crystal display (LCD) device with wide-viewing angles according to an exemplary embodiment of the present invention.

In FIG. 4, the LCD device of the present invention includes a liquid crystal panel 110, a first polarizer 120 and a second polarizer 130. The liquid crystal panel 110 displays images. The first polarizer 120 is attached to a first side of the liquid crystal panel 110, and the second polarizer 130 is attached to a second side of the liquid crystal panel 110 opposite to the first side.

Although not shown in the figure, the liquid crystal panel 110 includes first and second substrates and a liquid crystal layer therebetween. A pixel electrode and a common electrode are formed on one of the first and second substrates. For example, the pixel electrode and the common electrode may be formed on the first substrate, which is disposed under the second substrate and adjacent to the second polarizer 130. Liquid crystal molecules of the liquid crystal layer are arranged by an electric field generated between the pixel electrode and the common electrode, thereby controlling transmittance of light provided from a backlight unit (not shown) under the second polarizer 130.

For adhesion between components, a first adhesive layer 142 is disposed between the first polarizer 120 and the liquid crystal panel 110, and a second adhesive layer 144 is disposed between the second polarizer 130 and the liquid crystal panel 110. The first adhesive layer 142 may be formed on the first polarizer 120, and the second adhesive layer 144 may be formed on the second polarizer 130. Here, the first and second adhesive layers 142 and 144 may include pressure sensitive adhesive (PSA).

The first polarizer 120 includes a first polarizing film 122, a first optical compensation film 124, a second optical compensation film 125, a phase retardation film 127, a protective film 128, and a functional film 129. The first and second optical compensation films 124 and 125 are formed on a first surface of the first polarizing film 122, and the phase retardation film 127, the protective film 128 and the functional film 129 are formed on a second surface of the first polarizing film 122. The first polarizer 120 is attached to a front surface of the liquid crystal panel 110, trough which light is outputted to display an image. The second optical compensation film 125, the first optical compensation film 124, the first polarizing film 122, the phase retardation film 127, the protective film 128, and the functional film 129 are disposed from the front surface of the liquid crystal 110 in order.

The first polarizing film 122 may include polyvinyl alcohol (PVA) and may be formed by dyeing a PVA film with iodide ions or dichroic dyes and then stretching the PVA film. The first polarizing film 122 has an absorption axis along a stretching direction. The first polarizing film 122 absorbs light vibrating in a direction parallel to the absorption axis and transmits light vibrating in a direction perpendicular to the absorption axis.

The first optical compensation film 124 may be a negative B plate, which has an in-plane retardation value Re of 120±10 nm and a thickness retardation value Rth of 100±30 nm. The second optical compensation film 125 may be a positive C plate, which has a thickness retardation value Rth of −130±30 nm and Nz of infinity. Here, Re=(nx−ny)d, Rth=(nz−ny)d, and Nz=(nx−nz)/(nx−ny), wherein in xyz coordinates, an in-plane refractive index in an x-axis direction is nx, an in-plane refractive index in a y-axis direction is ny, a thickness refractive index in a z-axis direction is nx, and a thickness of a film in the z-axis direction is d.

The first optical compensation film 124 may include cyclic olefin polymer (COP) and may be formed by stretching a COP film.

The second optical compensation film 125 may include a liquid crystal material and may be formed by forming an alignment layer (not shown) on the first optical compensation film 124 and applying the liquid crystal material to the alignment layer. For example, the second optical compensation film 125 may include a discotic liquid crystal material.

The phase retardation film 127 may be a quarter wave plate (QWP) having a retardation value of 80 /4. The phase retardation film 127 may have an in-plane retardation value Re of 110 nm to 130 nm and Nz of 0.5 to 2.0.

The phase retardation film 127 may include a liquid crystal material and may be formed by forming an alignment layer (not shown) on one surface of the protective film 128 and applying the liquid crystal material to the alignment layer. Here, the liquid crystal material may have a rod-like molecule structure, and for example, the phase retardation film 127 may include reactive mesogen.

The protective film 128 may include an acrylic material and may have relatively low moisture permeability. Here, the acrylic material may include at least one of (meth) acrylate monomer and (meth) acrylamide monomer containing an aliphatic ring or an aronmatic ring on the basis of poly(methyl methacrylate) (PMMA).

The functional film 129 has anti-static and hard-coating functions. The functional film 129 may have a multi-layered structure on another surface of the protective film 128 and may include a hard-coating layer and an anti-static layer sequentially formed on the protective film 128. The hard-coating layer may include acrylate resin or curable silicone resin. The anti-static layer may include gold (Au) and azo tin oxide (ATO) and, beneficially, may have resistance of 100 to 800 MΩ by controlling the mixture ratio of gold and ATO.

The first polarizer 120 may be formed by forming the second optical compensation film 125 on one surface of the first optical compensation film 124, attaching another surface of the first optical compensation film 124 to the first surface of the first polarizing film 122 using adhesive, forming the phase retardation film 127 on one surface of the protective film 128, attaching the phase retardation film 127 to the second surface of the first polarizing film 122 using adhesive, and forming the functional film 129 on another surface of the protective film 128 before or after attaching the phase retardation film 127 to the second surface of the first polarizing film 122.

Here, the adhesive may be ultraviolet (UV) curable adhesive.

Meanwhile, the second polarizer 130 includes a second polarizing film 132, an inner protective film 134 at an inner surface of the second polarizing film 132, and an outer protective film 136 and a brightness enhancement film 138 at an outer surface of the second polarizing film 132. The second polarizer 130 is attached to a rear surface of the liquid crystal panel 110 and disposed between the liquid crystal panel 110 and the backlight unit (not shown). The inner protective film 134, the second polarizing film 132, the outer protective film 136 and the brightness enhancement film 138 are disposed from the rear surface of the liquid crystal panel 110 in order.

The second polarizing film 132 may be formed by dyeing a PVA film with iodide ions or dichroic dyes and then stretching the PVA film. An absorption axis of the second polarizing film 132 is perpendicular to the absorption axis of the first polarizing film 122.

The inner protective film 134, beneficially, may have no retardation and specially, may have zero thickness retardation value. The inner protective film 134 may include tri-acetyl cellulose (TAC) or cyclic olefin polymer (COP).

The outer protective film 136 may include tri-acetyl cellulose (TAC).

The inner and outer protective films 134 and 136 may be formed by a coating method.

The brightness enhancement film 138 is a reflective polarization brightness enhancement film, which lowers brightness of the backlight unit (not shown) to reduce power in consumption. The brightness enhancement film 138 may include dual brightness enhancement film (DBEF) of 3M or advanced polarizing conversion film (APCF) of Nitto Denko.

In the liquid crystal display device according to the exemplary embodiment of the present invention, the films of the first polarizer 120 and the second polarizer 130 may be formed by a coating method, and thus the first polarizer 120 and the second polarizer 130 may have thinner thicknesses than the related art polarizers. For example, the first polarizer 120 may have a thickness of 115 micrometers, and the second polarizer 130 may have a thickness of 125 micrometers.

In the liquid crystal display device of the present invention, the phase retardation film 127 having a retardation value of λ/4 is disposed on the first polarizing film 122 over the liquid crystal panel 110, and linearly polarized light passing through the first polarizing film 122 is changed into circularly polarized light while passing through the phase retardation film 127. Therefore, color differences are not caused according to viewing angles even if the device is viewed through the polarized sunglasses.

Figure 5:
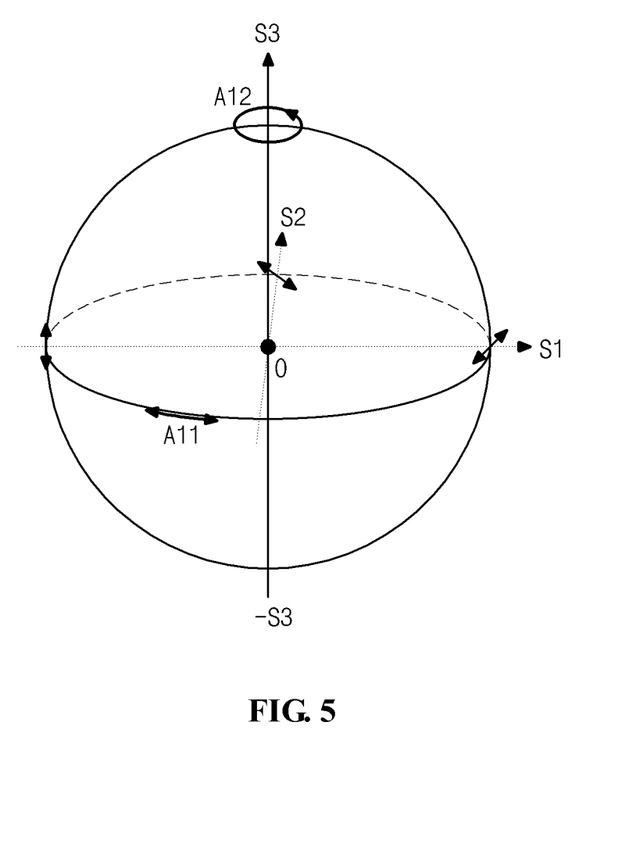
FIG. 5 is a view of illustrating Poincare sphere showing polarization state of light passing through the first polarizer of FIG. 4 and an absorption axis of polarized sunglasses.

FIG. 5 is a view of illustrating Poincare sphere showing polarization state of light passing through the first polarizer of FIG. 4 and an absorption axis of polarized sunglasses.

Poincare sphere represents polarization states of light on a spherical surface. Poincare sphere is widely used for designing compensation films because polarization states are easily predicted by using Poincare sphere if optical axes and phase retardation values of the optical elements are known.

In Poincare sphere, the equator passing the points S1 and S2 designates the linear polarization, the polar point S3 designates the left handed circular polarization, the polar point −S3 designates the right handed circular polarization, the upper hemisphere designates the left handed elliptical polarization, and the lower hemisphere designates right handed elliptical polarization. The linear polarization at the point S1 has an angle of 45 degrees with respect to the linear polarization at the point S2.

In FIG. 5, the absorption axis A11 of the polarized sunglasses is disposed on the equator designating the linear polarization. The polarization state of light passing through the phase retardation film 127 of the first polarizer 120 of FIG. 4 is disposed on the point S3 designating the left handed circular polarization.

Accordingly, when the liquid crystal display device of FIG. 4 is viewed through polarized sunglasses, degrees of polarization are the same at any viewing angle, and images with the same color impression are seen at all viewing angles.

Meanwhile, optical compensation effect in the liquid crystal display device according to the exemplary embodiment of the invention will be described with reference to FIG. 6.

Figure 6:
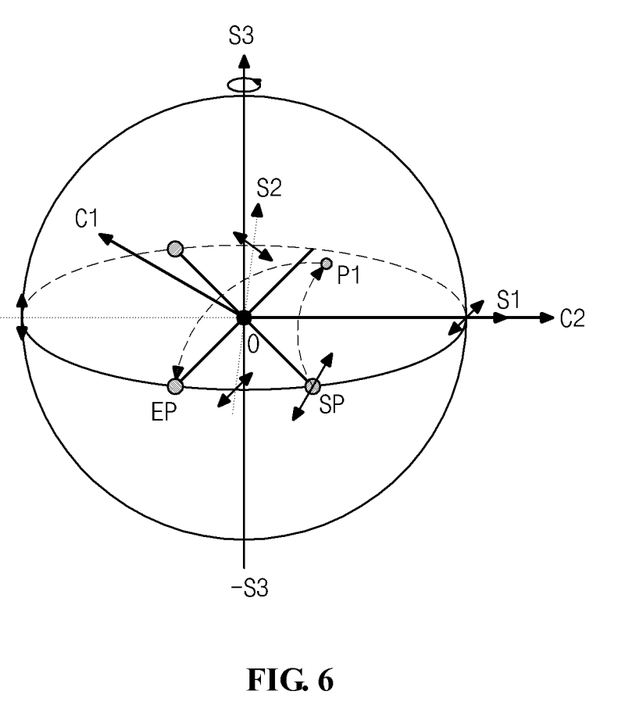
FIG. 6 is a view of illustrating Poincare sphere showing polarization states of light in a liquid crystal display device according to the exemplary embodiment of the present invention.

FIG. 6 is a view of illustrating Poincare sphere showing polarization states of light in a liquid crystal display device according to the exemplary embodiment of the present invention and corresponds to the case that the liquid crystal display device of FIG. 4 is viewed at a diagonal direction.

Here, the liquid crystal layer 110 does not have phase retardation. The polarization state of light passing through the second polarizer 130 is a start point SP, and the polarization state of light reaching the first polarizing film 122 of the first polarizer 120 is an end point EP. That is, the start point SP corresponds to a direction of a transmission axis of the second polarizing film 132 of the second polarizer 130, and a symmetrical point to the start point SP with respect to the center O of Poincare sphere corresponds to a direction of the absorption axis of the second polarizing film 132 of the second polarizer 130. At this time, the end point EP corresponds to a direction of the absorption axis of the first polarizing film 122. In addition, C1 corresponds to a direction of an optical axis of the first optical compensation film 124, and C2 corresponds to a direction of an optical axis of the second optical compensation film 125.

In FIG. 4 and FIG. 6, light passing through the second polarizer 130 is linearly polarized, and the polarization state of the light is disposed on the start point SP on the equator, thereby passing through the liquid crystal panel 110 without any change. Then, light passing through the liquid crystal panel 110 has a changed polarization state by about ¼ circle with the optical axis C2 of the second optical compensation film 125 as the center while passing through the second optical compensation film 125, and polarization state of light passing through the second optical compensation film 125 moves to a point P1. Next, the light passing through the second optical compensation film 125 has a changed polarization state by about ¼ circle with the optical axis C1 of the first optical compensation film 124 as the center while passing through the first optical compensation film 124, and polarization state of light passing through the first optical compensation film 124 moves to a point P2.

Therefore, the polarization state of light passing through the first optical compensation film 124 coincides with the direction of the absorption axis of the first polarizing film 122, and an excellent black image is viewed at the diagonal direction.

In the present invention, a polarizer including first and second optical compensation films is adopted to a liquid crystal display device, and optical properties are compensated at side viewing angles to increase the contrast ratio.

Moreover, a phase retardation film is disposed on a polarizing film of a polarizer over a liquid crystal panel, and light outputted from the liquid crystal display device is circularly polarized. Thus, even though the liquid crystal display device is viewed through polarized sunglasses, there is no color difference according to viewing angles. Therefore, high quality images with the same color impression are seen at all viewing angles.

In the meantime, the films of the polarizer are formed by a coating method, and the thickness of the polarizer is relatively thin.

It will be apparent to those skilled in the art that various modifications and variations can be made in a display device of the present disclosure without departing from the sprit or scope of the invention. Thus, it is intended that the present invention covers the modifications and variations of this invention provided they come within the scope of the appended claims and their equivalents.

What is claimed is:

1. A liquid crystal display device, comprising:
   a liquid crystal panel;
   a first polarizer attached to a first surface of the liquid crystal panel and including a first polarizing film, first and second optical compensation films, a phase retardation film, a protective film, and a functional film providing at least one of a hard-coating function and an anti-static function, wherein the first and second optical compensation films are disposed on one surface of the first polarizing film, and the phase retardation film, the protective film and the functional film are disposed on another surface of the first polarizing film; and
   a second polarizer attached to a second surface of the liquid crystal panel and including a second polarizing film, an inner protective film, and an outer protective film, wherein the inner protective film is disposed on one surface of the second polarizing film, and the outer protective film is disposed on another surface of the second polarizing film,
   wherein the first polarizing film is disposed between the phase retardation film and the liquid crystal panel, and the phase retardation film has a retardation value of $\lambda/4$,
   wherein the first and second optical compensation films are disposed between the phase retardation film and the liquid crystal panel, and
   wherein the phase retardation film is configured to convert linearly polarized light received from the first polarizing film into circularly polarized light output by the liquid crystal display device.

2. The device according to claim 1, wherein the first optical compensation film is a negative B plate, and the second optical compensation film is a positive C plate.

3. The device according to claim 2, wherein the second optical compensation film is disposed between the first optical compensation film and the liquid crystal panel.

4. The device according to claim 2, where the first optical compensation film has an in-plane retardation value of 120±10 nm and a thickness retardation value of 100±30 nm, and the second optical compensation film has a thickness retardation value of −130+30 nm.

5. The device according to claim 1, wherein the phase retardation film includes a liquid crystal material, and an alignment layer is formed between the protective film and the phase retardation film.

6. The device according to claim 1, wherein the second optical compensation film includes a liquid crystal material, and an alignment layer is formed between the first optical compensation film and the second optical compensation film.

7. The device according to claim 1, wherein the functional film includes an anti-static layer and a hard-coating layer.

8. The device according to claim 7, wherein the anti-static layer includes gold and azo tin oxide.

9. The device according to claim 1, wherein the second polarizer further includes a brightness enhancement film on an outer surface of the outer protective film.

10. The device according to claim 1, wherein the second compensation film, the first compensation film, the first polarizing film and the phase retardation film are sequentially stacked in that order on the liquid crystal panel.

* * * * *